(12) United States Patent
Brown et al.

(10) Patent No.: US 7,796,338 B2
(45) Date of Patent: Sep. 14, 2010

(54) METHOD AND APPARATUS FOR OPTICAL BANDPASS FILTERING, AND VARYING THE FILTER BANDWIDTH

(75) Inventors: Douglas J. Brown, Midland (CA); Daniel B. Mitchell, Port McNicoll (CA); Geoffrey G. Harris, Midland (CA); William Conrad Stenton, Midland (CA); Gerard M. Desroches, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 247 days.

(21) Appl. No.: 12/169,808

(22) Filed: Jul. 9, 2008

(65) Prior Publication Data

US 2010/0007963 A1 Jan. 14, 2010

(51) Int. Cl.
*G02B 27/14* (2006.01)
*G02B 27/10* (2006.01)
(52) U.S. Cl. .............. 359/629; 359/618; 359/634; 398/85
(58) Field of Classification Search .............. 359/333, 359/498, 578, 579, 629, 633, 634, 636, 637; 356/419, 445, 519; 385/14, 24, 33, 39, 47; 372/6, 71, 98, 106; 398/85–87; 136/246
See application file for complete search history.

(56) References Cited

U.S. PATENT DOCUMENTS

| | | | |
|---|---|---|---|
| 6,118,912 A * | 9/2000 | Xu | 385/24 |
| 6,636,357 B2 * | 10/2003 | Robins et al. | 359/579 |
| 6,700,690 B1 | 3/2004 | Buchsbaum et al. | |
| 6,928,210 B2 * | 8/2005 | Kropp | 385/24 |
| 7,079,322 B2 * | 7/2006 | Minakawa et al. | 359/629 |
| 7,215,885 B2 * | 5/2007 | Yamane et al. | 398/85 |
| 7,477,392 B2 * | 1/2009 | Leidecker et al. | 356/419 |
| 7,616,845 B2 * | 11/2009 | Matsuoka et al. | 385/14 |

OTHER PUBLICATIONS

U.S. Appl. No. 12/363,527, filed Jan. 30, 2009 by inventors Douglas J. Brown, Daniel B. Mitchell, Geoffrey G. Harris, Gerard M. Desroches, William Conrad Stenton for "Method and Apparatus for Optical Bandpass and Notch Filtering, and Varying the Filter Center Wavelength", 25 pages of text, 12 pages of drawings.
U.S. Appl. No. 12/554,240, filed Sep. 4, 2009 by inventors Douglas J. Brown, Daniel B. Mitchell, and Geoffrey G. Harris for "Method and Apparatus for Optical Filtering with Two Passbands", 27 pages of text, 6 pages of drawings.

* cited by examiner

*Primary Examiner*—Loha Ben
(74) *Attorney, Agent, or Firm*—Haynes and Boone, LLP

(57) ABSTRACT

A path of travel for radiation extends to one optical element, then to another optical element, and then away from the latter. One of the optical elements is respectively reflective and non-reflective to radiation above and below a first wavelength, and the other is respectively reflective and non-reflective to radiation below and above a second wavelength. According to a different aspect, a path of travel for radiation extends to one of first and second optical elements, then to the other optical element, and then away from the latter. The first optical element is reflective and non-reflective to radiation on respective sides of a first wavelength, and the second optical element is reflective and non-reflective to radiation on respective sides of a second wavelength. The first optical element can tilt in relation to the path of travel to change the first wavelength.

28 Claims, 4 Drawing Sheets

METHOD AND APPARATUS FOR OPTICAL BANDPASS FILTERING, AND VARYING THE FILTER BANDWIDTH

FIELD OF THE INVENTION

This invention relates in general to bandpass filters and, more particularly, to optical bandpass filters, including techniques for varying the bandwidth of an optical bandpass filter.

BACKGROUND

In optical systems, it is often desirable to use a bandpass filter. One traditional form of optical bandpass filter involves a substrate with a coating containing multiple layers of optical materials. However, the number of layers needed in the coating can often exceed 100-150 layers, resulting in a very high cost. Moreover, the effective bandwidth and the center wavelength are essentially fixed during manufacture, and can only be tuned by a very small amount (always shorter and narrower), in particular by tilting the filter relative to an incident beam. However, at higher angles of incidence, the amplitude transmission deteriorates. Also, due to the transmissive nature of the filter, it can be difficult to design a coating that provides a passband for certain wavelengths ranges. For example, the substrate and/or coating materials may tend to absorb radiation in the ultra violet range.

Another consideration is that optical alignment problems can result from deviation imparted to the beam as the beam passes through the substrate. Still another consideration is that the relatively large number of coating layers can induce substrate curvature, due to tensile and/or compressive stresses stacking up in the coating. This can cause wavefront distortion and/or beam deviation, resulting in optical misalignment problems in sensitive optical systems.

According to a different approach, a beam is routed successively through two separate edge filters, one of which passes longer wavelengths, and the other of which passes shorter wavelengths. Each of these filters has a gradient-thickness coating provided on a plane-parallel substrate. In other words, each has a substrate of uniform thickness, with a coating that progressively increases or decreases in thickness along the substrate. The coating may be a multi-layer coating, where each layer progressively increases or decreases in thickness along the substrate. The two filters can be moved in a lengthwise direction with respect to each other, or in other words approximately perpendicular to the direction of travel of radiation. As a result of this relative movement, the width of the passband increases or decreases. However, the manufacture of gradient-thickness coated filters is complex and expensive. Also, due to the transmissive nature of the filters, absorption and beam deviation can be problems.

The types of optical bandpass filters mentioned above have been generally adequate for their intended purposes but, as noted in the foregoing discussion, they have not been satisfactory in all respects.

BRIEF DESCRIPTION OF THE DRAWINGS

A better understanding of the present invention will be realized from the detailed description that follows, taken in conjunction with the accompanying drawing, in which.

DETAILED DESCRIPTION

Figure 1:
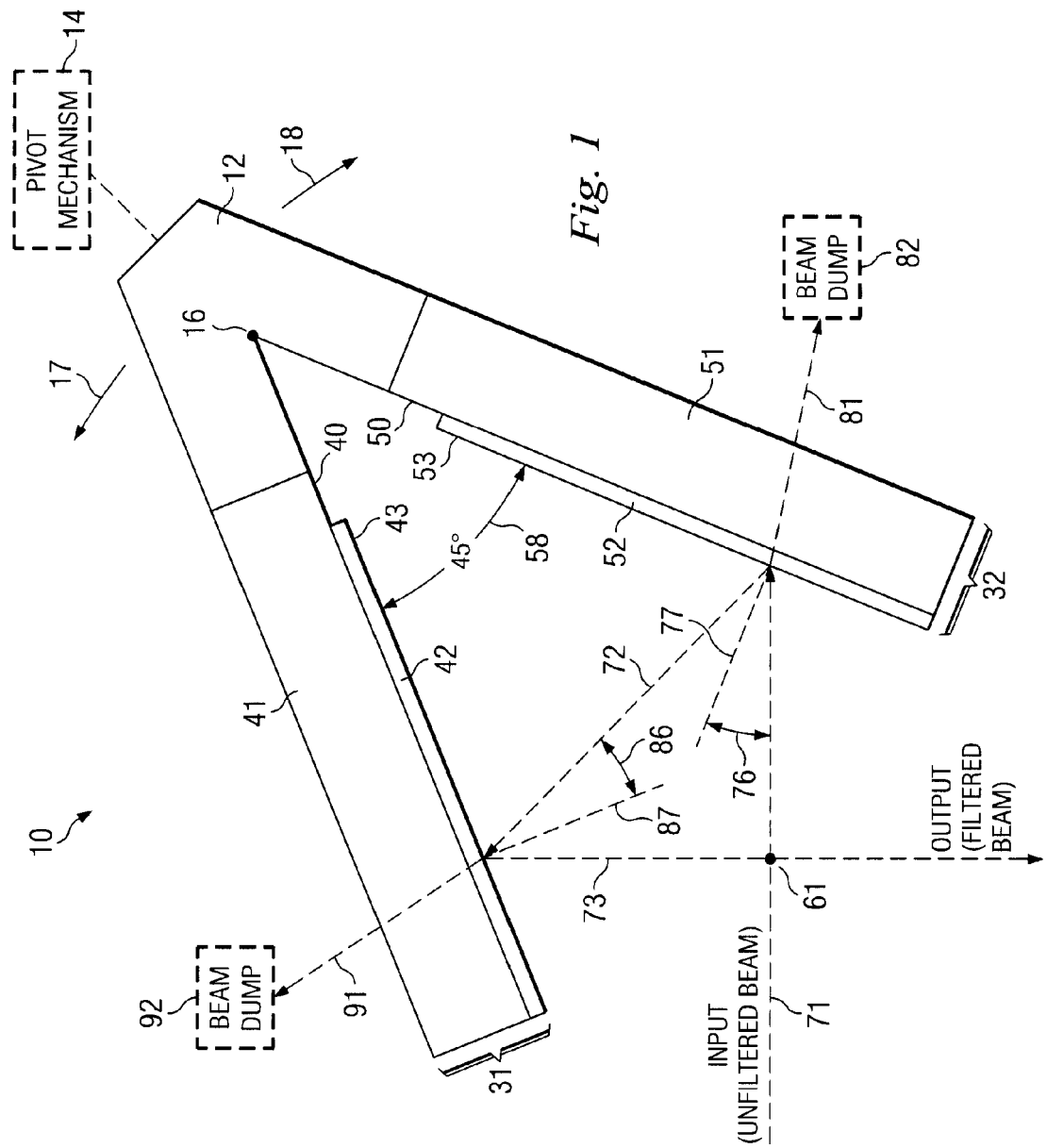
FIG. 1 is a diagrammatic view of an optical bandpass filter that has two edge filters and a variable bandwidth, and that embodies aspects of the invention.

FIG. 1 is a diagrammatic view of an optical bandpass filter 10 that has a variable bandwidth, and that embodies aspects of the invention. The bandpass filter 10 includes a support member 12, and a pivot mechanism that is shown diagrammatically at 14. The pivot mechanism 14 supports the member 12 for limited pivotal movement about a pivot axis 16 that extends perpendicular to the plane of the drawing. In FIG. 1, the member 12 is shown in a center position. The pivot mechanism 14 can selectively pivot the member 12 a few degrees away from the illustrated center position about the axis 16, in either of two opposite directions 17 and 18. The pivot mechanism 14 can also releasably maintain the member 12 in any angular position.

The bandpass filter 10 includes two edge filters 31 and 32 of a known type that each have one end fixedly secured to the member 12. The edge filter 31 has a substrate 41 with a planar surface 40 thereon that faces the other edge filter 32. The edge filter 31 also includes a multi-layer filter coating 42 provided on the surface 40. The filter coating 42 has a planar outer surface 43. Similarly, the edge filter 32 has a substrate 51 with a planar surface 50 thereon that faces the other edge filter 31. The edge filter 32 also includes a multi-layer filter coating 52 provided on the surface 50. The filter coating 52 has a planar outer surface 53. The filter coatings 42 and 52 are very thin but, for clarity, are shown with exaggerated thicknesses in FIG. 1. The edge filters 31 and 32 are oriented so that the surfaces 40 and 50, the coatings 42 and 52, and the surfaces 43 and 53, form a 45° angle 58 with respect to each other. The pivot axis 16 is positioned at a location corresponding to an intersection of the surfaces 40 and 50. When the member 12 is in the center position shown in FIG. 1, a not-illustrated imaginary line that bisects the 45° angle 58 would intersect the pivot axis 16, and also a point 61.

Radiation can travel along a path that includes three successive portions 71, 72 and 73. The portions 71 and 73 intersect at the point 61. An unfiltered beam of radiation enters the bandpass filter 10 along the portion 71 of the path of travel. Assume for the sake of discussion that this unfiltered beam includes radiation at wavelengths within the passband of the filter 10, as well as wavelengths above the passband, and wavelengths below the passband. This unfiltered beam travels along the path of travel 71, which passes through the point 61, and eventually reaches the edge filter 32. The portion 71 of the path of travel forms an angle 76 with respect to a line 77 that is perpendicular to the surface 53 of the edge filter 32. This angle 76 is referred to as the angle of incidence (AOI) of the radiation on the edge filter 32. The AOI 76 can vary, as discussed later. When the member 12 is in the center position shown in FIG. 1, the AOI 76 is 22.5°.

In the disclosed embodiment, the edge filter 32 functions as a short wavelength reflection filter. In particular, wavelengths above the passband of the filter 10 are transmitted through the edge filter 32 along a path 81, and are discarded. For example, they may be absorbed by a beam dump 82. The beam dump 82 is shown diagrammatically in broken lines in FIG. 1, because it is optional, and is an arrangement of a known type. In contrast, wavelengths within and below the passband of the filter 10 are reflected by the edge filter 32, and travel along the portion 72 of the path of travel to the edge filter 31. The portion 72 of the path of travel forms an AOI 86 with respect to a line 87 perpendicular to the surface 43 of the edge filter 31. When the member 12 is in its center position, the AOI 86 is 22.5°.

The edge filter 31 functions as a long wavelength reflection filter. Wavelengths below the bandpass of the filter 10 are transmitted through the edge filter 31 along a path 91, and are discarded. For example, these wavelengths may be absorbed by a beam dump 92. The beam dump 92 is shown diagrammatically in broken lines in FIG. 1, because it is optional, and is an arrangement of a known type. The edge filter 31 reflects wavelengths that are within and above the passband of the filter 10. Of course, as a practical matter, the filter 32 has already removed wavelengths that are above the passband. Consequently, as a practical matter, the only radiation actually reflected by the filter 31 is radiation containing wavelengths that are within the passband. These reflected wavelengths in the passband then travel along the portion 73 of the path of travel, which passes through the point 61. This radiation then exits the filter apparatus 10 by continuing to propagate along the portion 73 of the path of travel.

As discussed earlier, the pivot mechanism 14 can effect a few degrees of pivotal movement of the member 12 and the edge filters 31 and 32 about the pivot axis 16, in either of the directions 17 and 18. As this pivotal movement occurs, the portions 71 and 73 of the path of travel will remain in the same positions shown in FIG. 1, in part because the pivot axis 16 has intentionally been located at a position corresponding to an intersection of the surfaces 40 and 50. Since the portions 71 and 73 of the path of travel do not move, there is no need to effect optical realignment in relation to other optical components as the width of the passband is adjusted.

On the other hand, during pivotal movement of the member 12 and edge filters 31 and 32, the position of the portion 72 of the path of travel will change slightly, and the AOIs 76 and 86 will each change. In particular, if the member 12 with filters 31 and 32 is pivoted counterclockwise in the direction 17, the AOI 76 will decrease, and the AOI 86 will increase. Conversely, if the member 12 with filters 31 and 32 is pivoted clockwise in the direction 18 about the axis 16, the AOI 76 will increase and the AOI 86 will decrease. Due to these changes in the AOIs 76 and 86, the width of the passband of the filter 10 will change, as discussed in more detail below.

Figure 2:
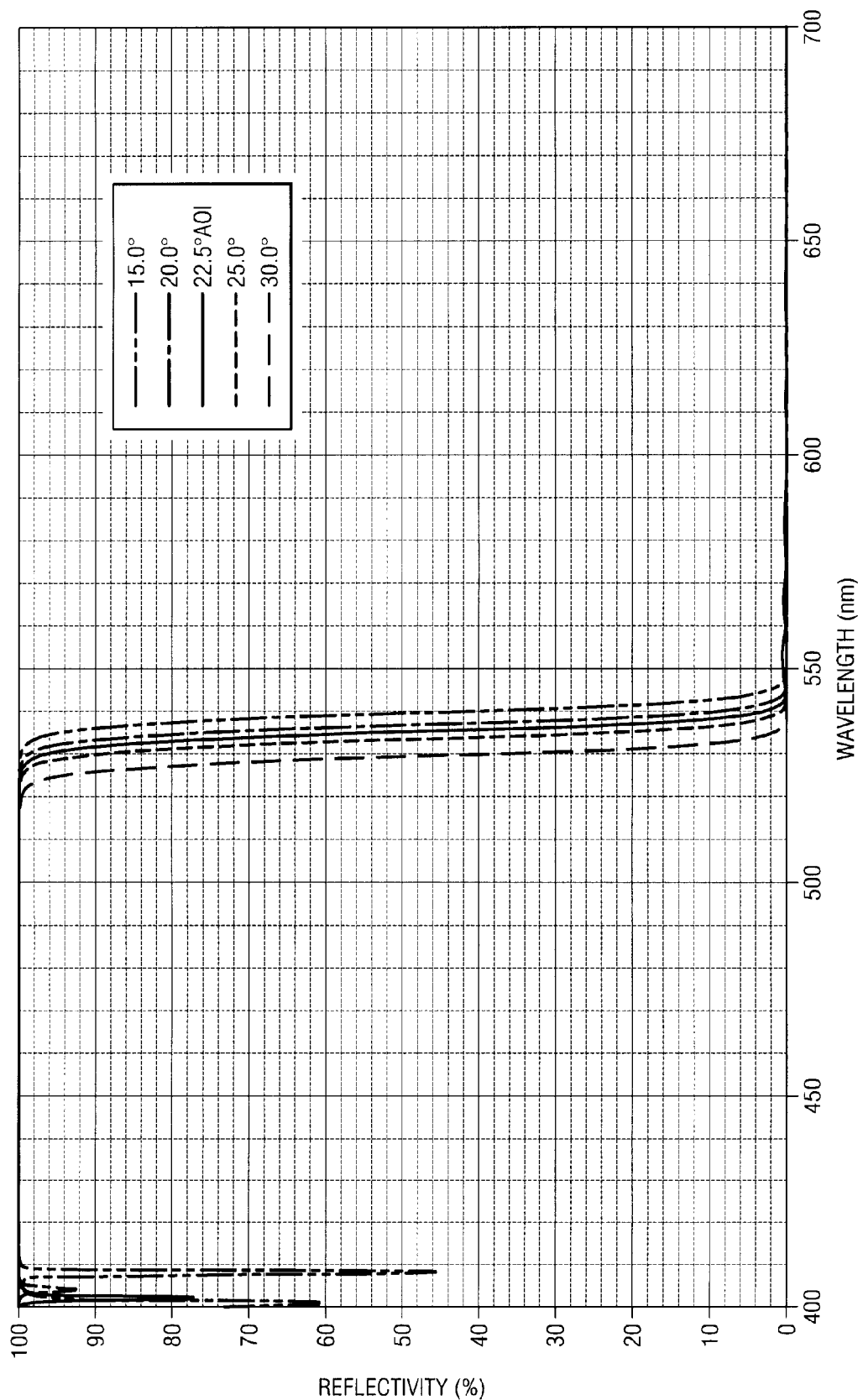
FIG. 2 is a graph relating to one of the edge filters of FIG. 1, showing the reflectivity of that edge filter over a selected range of wavelengths.

As mentioned earlier, the edge filter 32 functions as a short wavelength reflection filter, based on the wavelengths that it reflects. FIG. 2 is a graph showing the reflectivity of the edge filter 32 with respect to a selected range of wavelengths. It is an inherent characteristic of this type of edge filter that, as the AOI 76 varies, the wavelength of the "edge" of the filter 32 will change. In particular, FIG. 2 shows that, as the AOI 76 varies through a range of about 15°, the "edge" of the filter 32 will vary from a wavelength of about 530 nm up to a wavelength of about 540 nm.

Figure 3:
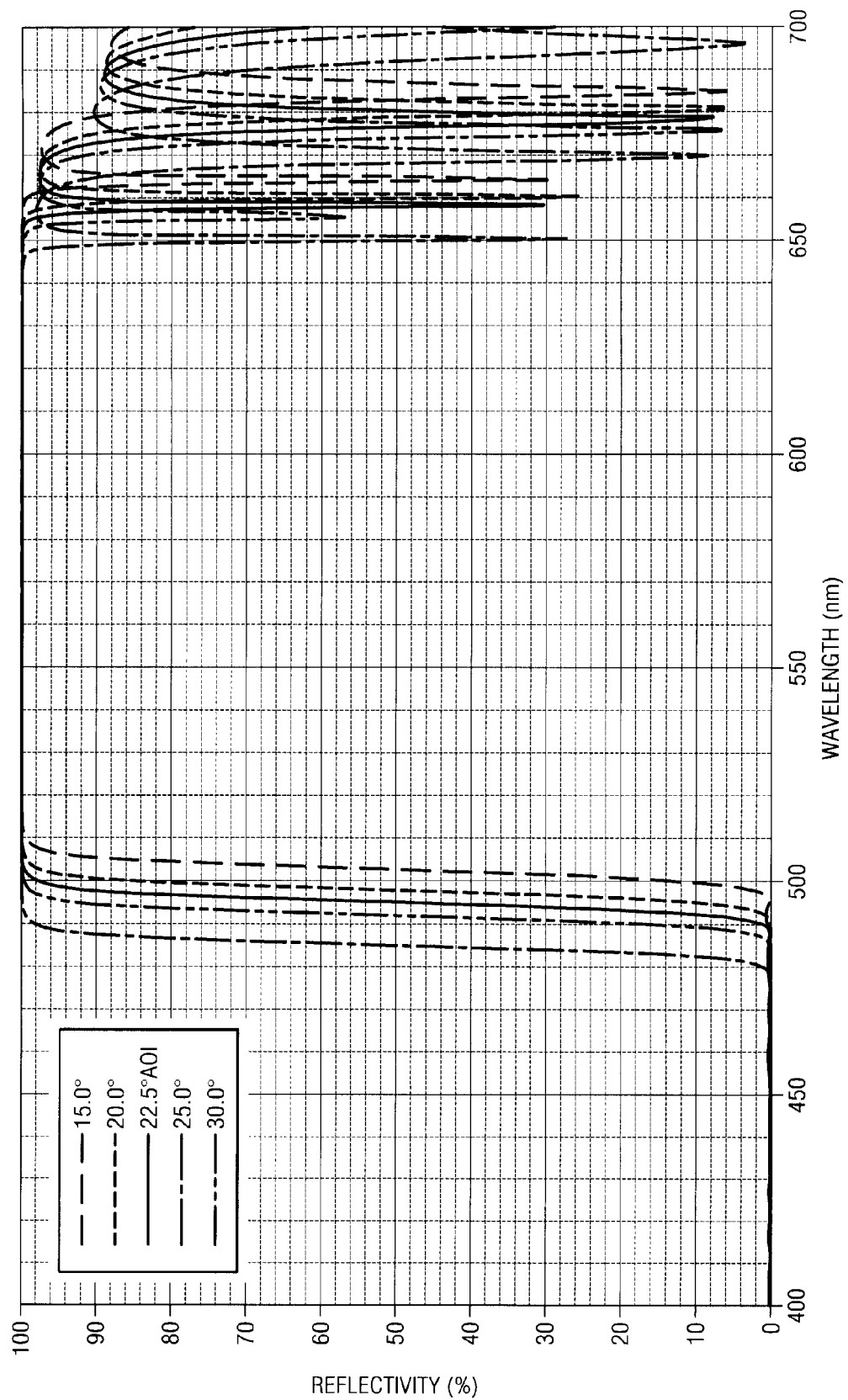
FIG. 3 is a graph relating to the other of the edge filters of FIG. 1, showing the reflectivity of that edge filter over a selected range of wavelengths.

Similarly, as mentioned earlier, the edge filter 31 functions as a long wavelength reflection filter, based on the wavelengths that it reflects. FIG. 3 is a graph showing the reflectivity of the edge filter 31 with respect to a selected range of wavelengths. FIG. 3 shows that, as the AOI 86 varies through a range of about 15°, the "edge" of the filter 31 will vary from a wavelength of about 485 nm up to a wavelength of about 503 nm.

At the left side of FIG. 2, it will be noted that the edge filter 32 exhibits some aberrations in the range of approximately 400 nm to 410 nm. However, this does not matter in the apparatus 10 of FIG. 1, because the other edge filter 31 strips off and discards wavelengths in this range. Similarly, at the right side of FIG. 3, it will be noted that the edge filter 31 exhibits some aberrations for wavelengths above 650 nm. But again this does not matter, because the edge filter 32 removes and discards radiation in this range.

Figure 4:
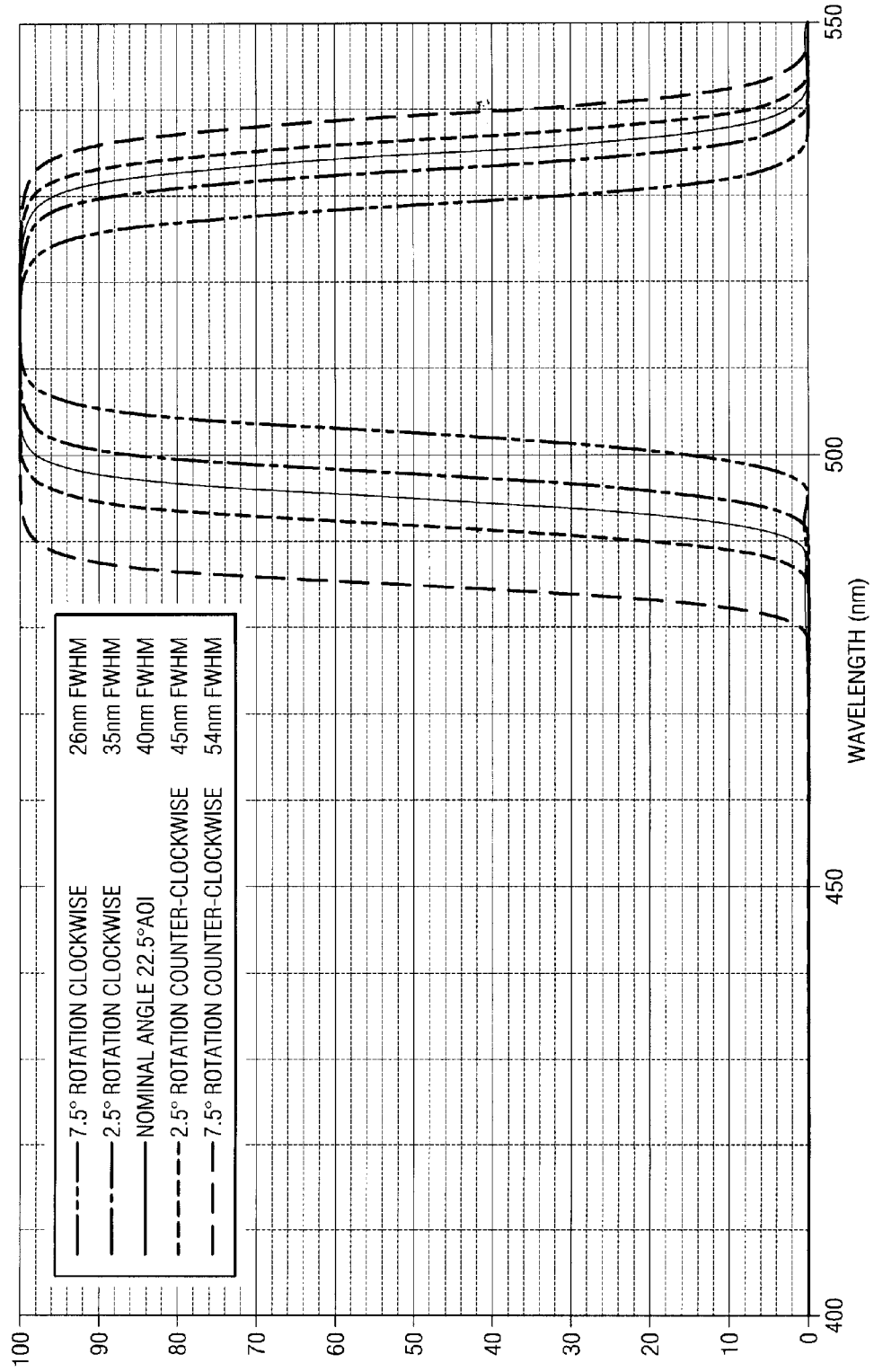
FIG. 4 is a graph showing the combined effect of the two edge filters, representing the overall passband of the optical bandpass filter of FIG. 1.

FIG. 4 is a graph showing the combined effect of the two edge filters 31 and 32, or in other words the overall passband defined by the optical bandpass filter 10 of FIG. 1. It will be noted in FIG. 4 that, when the member 12 with edge filters 31 and 32 has been rotated 7.5° clockwise in the direction 18 from its center position, the width of the bandpass of the filter 10 will be approximately 26 nm (from about 503 nm to about 529 nm), where FWHM in FIG. 4 means full width at half maximum. If the member 12 with edge filters 31 and 32 is then rotated counterclockwise in the direction 17, the width of the passband will progressively increase in a continuous manner. For example, when the member 12 with edge filters 31 and 32 is in the center position of FIG. 1, the passband will be approximately 40 nm (from about 495 nm to about 535 nm). If the member 12 with edge filters 31 and 32 is then rotated another 7.5° counterclockwise in the direction 17, the passband will further increase to a width of approximately 54 nm (from about 485 nm to about 539 nm).

When the member 12 with the edge filters 31 and 32 is in its center position, the AOIs 76 and 86 are each 22.5°. In this position, the two coatings 42 and 52 are oriented so that they each have the greatest sensitivity to angular movement, with little adverse influence from the Brewster's-angle effect. In other words, for randomly polarized light, the two edges of the passband can be kept as sharp as possible, without having the edge shape degraded by polarization splitting. If the input beam is fully polarized, there is no adverse change in edge shape caused by polarization splitting.

The coatings 42 and 52 are simple edge filters of a type known in the art, and are relatively easy and cheap to manufacture. Also, the filters 31 and 32 work in reflection, thereby reducing potential problems of material and substrate absorption. The substrates 41 and 51 can be made sufficiently thick to reduce or eliminate stress-related beam deviation or wavefront distortion. Moreover, the geometry of the filter 10 ensures that the output beam does not move relative to the input beam as the bandwidth is adjusted, thereby ensuring that beam pointing and boresight alignment do not vary as a result of bandpass tuning.

In the bandpass filter 10 of FIG. 1, the positions of the edge filters 31 and 32 could be swapped, so that radiation first encounters and is reflected by a long wavelength reflection filter, and then encounters and is reflected by a short wavelength reflection filter.

Although a selected embodiment has been illustrated and described in detail, it should be understood that a variety of substitutions and alterations are possible without departing from the spirit and scope of the present invention, as defined by the claims that follow.

What is claimed is:

1. An apparatus comprising:
   a first optical element; and
   a second optical element;
   wherein a path of travel for radiation has a first portion extending to a first location at said first optical element, a second portion extending from said first location to a second location at said second optical element, and a third portion extending away from said second location; and
   wherein one of said first and second optical elements is reflective and non-reflective to radiation that is respectively above and below a first wavelength, and that arrives along said path of travel, and the other of said optical elements is reflective and non-reflective to radiation that is respectively below and above a second wavelength, and that arrives along said path of travel, said first and second wavelengths being different, and radiation that is between said first and second wavelengths being reflected at each of said first and second optical elements during travel along said path of travel.

2. An apparatus according to claim 1, wherein said one of said optical elements is supported for tilting movement in relation to said path of travel, said first wavelength changing as said one of said optical elements tilts in relation to said path of travel.

3. An apparatus according to claim 1, wherein said other of said optical elements is supported for tilting movement in relation to said path of travel, said second wavelength changing as said other of said optical elements tilts in relation to said path of travel.

4. An apparatus according to claim 3, wherein said one of said optical elements is supported for tilting movement in relation to said path of travel, said first wavelength changing as said one of said optical elements tilts in relation to said path of travel.

5. An apparatus according to claim 4, wherein said optical elements are fixedly coupled so that they tilt simultaneously about a pivot axis in relation to said path of travel, said first wavelength increasing and said second wavelength decreasing as said optical elements tilt about said axis in a first direction, and said first wavelength decreasing and said second wavelength increasing as said optical elements tilt about said axis in a second direction opposite said first direction.

6. An apparatus according to claim 5,
wherein said first optical element has a substantially planar first surface thereon, said first location being disposed at said first surface;
wherein said second optical element has a substantially planar second surface thereon, said second location being disposed at said second surface; and
wherein said first and second surfaces are oriented at a predetermined angle with respect to each other.

7. An apparatus according to claim 6,
wherein said pivot axis extends approximately parallel to each of said first and second surfaces;
wherein said predetermined angle is approximately 45°;
wherein said first portion of said path of travel impinges on said first surface at an angle in the range of approximately 15° to 30° with respect to an imaginary line normal to said first surface; and
wherein said second portion of said path of travel impinges on said second surface at an angle in the range of approximately 15° to 30° with respect to an imaginary line normal to said second surface.

8. An apparatus according to claim 7,
wherein said first and third portions intersect at a point; and
wherein said pivot axis is normal to an imaginary plane containing each of said first and third portions.

9. An apparatus according to claim 8,
wherein said first optical element includes a first substrate having a first filter coating thereon, said first surface being provided on said first filter coating; and
wherein said second optical element includes a second substrate having a second filter coating thereon, said second surface being provided on said second filter coating.

10. An apparatus comprising:
a first optical element; and
a second optical element;
wherein a path of travel for radiation has a first portion extending to a first location at one of said first and second optical elements, a second portion extending from said first location to a second location at the other of said first and second optical elements, and a third portion extending away from said second location;
wherein said first optical element is reflective and non-reflective to radiation on respective sides of a first wavelength and arriving along said path of travel, and said second optical element is reflective and non-reflective to radiation on respective sides of a second wavelength and arriving along said path of travel, said first and second wavelengths being different; and
wherein said first optical element is supported for tilting movement in relation to said path of travel, said first wavelength changing as said first optical element tilts in relation to said path of travel.

11. An apparatus according to claim 10, wherein radiation that is between said first and second wavelengths is reflected at each of said first and second optical elements during travel along said path of travel.

12. An apparatus according to claim 10, wherein said second optical element is supported for tilting movement in relation to said path of travel, said second wavelength changing as said second optical element tilts in relation to said path of travel.

13. An apparatus according to claim 12, wherein said optical elements are fixedly coupled so that they tilt simultaneously about a pivot axis in relation to said path of travel, said first wavelength increasing and said second wavelength decreasing as said optical elements tilt about said axis in a first direction, and said first wavelength decreasing and said second wavelength increasing as said optical elements tilt about said axis in a second direction opposite said first direction.

14. An apparatus according to claim 13,
wherein said first optical element has a substantially planar first surface thereon, said first location being disposed at said first surface;
wherein said second optical element has a substantially planar second surface thereon, said second location being disposed at said second surface; and
wherein said first and second surfaces are oriented at a predetermined angle with respect to each other.

15. An apparatus according to claim 14,
wherein said pivot axis extends approximately parallel to each of said first and second surfaces;
wherein said predetermined angle is approximately 45°;
wherein said first portion of said path of travel impinges on said first surface at an angle in the range of approximately 15° to 30° with respect to an imaginary line normal to said first surface; and
wherein said second portion of said path of travel impinges on said second surface at an angle in the range of approximately 15° to 30° with respect to an imaginary line normal to said second surface.

16. An apparatus according to claim 15,
wherein said first and third portions intersect at a common point; and
wherein said pivot axis is normal to an imaginary plane containing each of said first and third portions.

17. An apparatus according to claim 16,
wherein said first optical element includes a first substrate having a first filter coating thereon, said first surface being provided on said first filter coating; and wherein said second optical element includes a second substrate having a second filter coating thereon, said second surface being provided on said second filter coating.

18. A method comprising:
causing radiation to propagate along a path of travel having a first portion extending to a first location at a first optical element, a second portion extending from said first location to a second location at a second optical element, and a third portion extending away from said second location; and
configuring one of said first and second optical elements to be reflective and non-reflective to radiation that arrives along said path of travel and that is respectively above and below a first wavelength; and
configuring the other of said optical elements to be reflective and non-reflective to radiation that arrives along said path of travel and that is respectively below and above a second wavelength different from said first wavelength; and
causing radiation that is traveling along said path of travel and that is between said first and second wavelengths to be reflected at each of said first and second optical elements during travel along said path of travel.

19. A method according to claim 18, including supporting said one of said optical elements for tilting movement in relation to said path of travel, said first wavelength changing as said one of said optical elements tilts in relation to said path of travel.

20. A method according to claim 18, including supporting said other of said optical elements for tilting movement in relation to said path of travel, said second wavelength changing as said other of said optical elements tilts in relation to said path of travel.

21. A method according to claim 20, including supporting said one of said optical elements for tilting movement in relation to said path of travel, said first wavelength changing as said one of said optical elements tilts in relation to said path of travel.

22. A method according to claim 21, including fixedly coupling said optical elements so that they tilt simultaneously about a pivot axis in relation to said path of travel, said first wavelength increasing and said second wavelength decreasing as said optical elements tilt about said axis in a first direction, and said first wavelength decreasing and said second wavelength increasing as said optical elements tilt about said axis in a second direction opposite said first direction.

23. A method according to claim 22, including:
configuring said first optical element to have a substantially planar first surface thereon, said first location being disposed at said first surface;
configuring said second optical element to have a substantially planar second surface thereon, said second location being disposed at said second surface;
orienting said first and second surfaces at a predetermined angle of approximately 45° with respect to each other;
orienting said pivot axis to extend approximately parallel to each of said first and second surfaces;
defining said first portion of said path of travel so that it impinges on said first surface at an angle in the range of approximately 15° to 30° with respect to an imaginary line normal to said first surface; and
defining said second portion of said path of travel so that it impinges on said second surface at an angle in the range of approximately 15° to 30° with respect to an imaginary line normal to said second surface.

24. A method comprising:
causing radiation to propagate along a path of travel having a first portion that extends to a first location at one of first and second optical elements, having a second portion that extends from said first location to a second location at the other of said first and second optical elements, and having a third portion that extends away from said second location;
causing said first optical element to be reflective and non-reflective to radiation on respective sides of a first wavelength and arriving along said path of travel;
causing said second optical element to be reflective and non-reflective to radiation on respective sides of a second wavelength and arriving along said path of travel, said first and second wavelengths being different; and
supporting said first optical element for tilting movement in relation to said path of travel, said first wavelength changing as said first optical element tilts in relation to said path of travel.

25. A method according to claim 24, wherein said causing radiation to propagate includes causing radiation between said first and second wavelengths to be reflected at each of said first and second optical elements during travel along said path of travel.

26. A method according to claim 24, including supporting said second optical element for tilting movement in relation to said path of travel, said second wavelength changing as said second optical element tilts in relation to said path of travel.

27. A method according to claim 26,
wherein said optical elements are fixedly coupled; and
wherein said tilting includes simultaneously tilting said optical elements about a pivot axis in relation to said path of travel, said first wavelength increasing and said second wavelength decreasing as said optical elements tilt about said axis in a first direction, and said first wavelength decreasing and said second wavelength increasing as said optical elements tilt about said axis in a second direction opposite said first direction.

28. A method according to claim 27, including:
configuring said first optical element to have a substantially planar first surface thereon, said first location being disposed at said first surface;
configuring said second optical element to have a substantially planar second surface thereon, said second location being disposed at said second surface;
orienting said first and second surfaces at a predetermined angle of approximately 45° with respect to each other;
orienting said pivot axis to extend approximately parallel to each of said first and second surfaces;
defining said first portion of said path of travel so that it impinges on said first surface at an angle in the range of approximately 15° to 30° with respect to an imaginary line normal to said first surface; and
defining said second portion of said path of travel so that it impinges on said second surface at an angle in the range of approximately 15° to 30° with respect to an imaginary line normal to said second surface.

* * * * *